United States Patent
Davis

(10) Patent No.: US 9,732,808 B2
(45) Date of Patent: *Aug. 15, 2017

(54) ONE WAY WEDGE CLUTCH WITH REDUCED FREEWHEEL FRICTION

(71) Applicant: Schaeffler Technologies AG & Co. KG, Herzogenaurach (DE)

(72) Inventor: Michael C. Davis, Sterling, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 857 days.

This patent is subject to a terminal disclaimer.

(21) Appl. No.: 13/937,525

(22) Filed: Jul. 9, 2013

(65) Prior Publication Data

US 2014/0014455 A1    Jan. 16, 2014

Related U.S. Application Data

(60) Provisional application No. 61/669,759, filed on Jul. 10, 2012.

(51) Int. Cl.
*F16D 41/063*    (2006.01)

(52) U.S. Cl.
CPC .................. *F16D 41/063* (2013.01)

(58) Field of Classification Search
CPC ........ F16D 41/06; F16D 41/063; F16D 41/20; F16D 13/12–13/18
See application file for complete search history.

(56) References Cited

U.S. PATENT DOCUMENTS

| 1,453,548 | A | * | 5/1923 | Duncombe | ........... | F16D 41/063 |
| | | | | | | 192/113.5 |
| 2,224,935 | A | * | 12/1940 | Schultz | ................ | F16D 41/063 |
| | | | | | | 192/105 BA |

(Continued)

FOREIGN PATENT DOCUMENTS

| EP | 1188946 A1 | 3/2002 |
| JP | 58187652 A | 11/1983 |
| KR | 2019980053504 U | 10/1998 |

OTHER PUBLICATIONS

International Search Report for PCT/US2013/049684, mailed Oct. 8, 2013 by Korean Intellectual Property Office.

*Primary Examiner* — Terry Chau
(74) *Attorney, Agent, or Firm* — Chester Paul Maliszewski

(57) ABSTRACT

A one-way clutch, including: an inner race including a first outer circumference with a first plurality of ramps and at least one wedge plate including: a first inner circumference with a second plurality of ramps; a second outer circumference; and a first plurality of slots: passing through material forming the at least one wedge plate in an axial direction; including respective first ends open to the second outer circumference; and including respective second ends radially outward of the first inner circumference and enclosed by the at least one wedge plate. The one-way clutch includes an outer race including a second inner circumference. The outer race is able to rotate with respect to the inner race in a first circumferential direction. Rotation of the outer race in a second circumferential direction, opposite the first circumferential direction, causes the rotation of the outer race to lock to rotation of the inner race.

13 Claims, 7 Drawing Sheets

(56) References Cited

U.S. PATENT DOCUMENTS

| | | | | |
|---|---|---|---|---|
| 2,804,956 | A | * | 9/1957 | Kreidler .................. F16D 41/06 |
| | | | | 192/45.017 |
| 3,202,250 | A | | 8/1965 | Fulton |
| 3,202,251 | A | * | 8/1965 | Fulton .................. F16D 41/063 |
| | | | | 192/104 B |
| 5,020,648 | A | * | 6/1991 | Bush ....................... F16D 7/048 |
| | | | | 188/82.6 |
| 6,386,349 | B1 | * | 5/2002 | Welch ..................... F16D 41/16 |
| | | | | 188/82.2 |
| 9,016,451 | B2 | * | 4/2015 | Davis ................. G01C 21/3632 |
| | | | | 192/41 S |
| 2009/0159390 | A1 | | 6/2009 | Davis |
| 2014/0332335 | A1 | * | 11/2014 | Strong ................... F16D 41/06 |
| | | | | 192/43 |
| 2014/0353107 | A1 | * | 12/2014 | Hemphill ............... F16D 41/00 |
| | | | | 192/20 |

\* cited by examiner

ONE WAY WEDGE CLUTCH WITH REDUCED FREEWHEEL FRICTION

CROSS-REFERENCE TO RELATED APPLICATIONS

This application claims the benefit under 35 U.S.C. §119 (e) of U.S. Provisional Patent Application No. 61/669,759, filed Jul. 10, 2012, which application is incorporated herein by reference in its entirety.

TECHNICAL FIELD

The present disclosure relates to a one-way clutch with reduced freewheel friction, in particular, a one-way wedge clutch minimizing radial force between wedge plates and an outer race in a free wheel mode.

BACKGROUND

FIG. 7 is an exploded view of one-way clutch 300 from commonly owned U.S. patent application Ser. No. 12/316,219, filed Dec. 10, 2008. Clutch 300 includes inner race 302, wedge plate 304, and outer race 306. Race 302 is fixed against rotation via splines 308. When the outer race rotates in circumferential direction CD1, clutch 300 is in free wheel mode, the outer race rotates with respect to the inner race and the wedge plates, and the inner circumference 310 of the outer race is in frictional engagement with the outer circumference 312 of the wedge plate. When the outer race reverses direction to rotate in circumferential direction CD2 (locking mode), the wedge plates expand against the inner and outer races to lock rotation of the outer race to rotation of the inner race, that is, to rotationally fix the outer race.

The frictional engagement of the wedge plate and outer race is necessary to enable the clutch to shift from free wheel mode to locking mode; however, the frictional engagement also opposes rotation of the outer race, which dissipates a torque load applied to the outer race. Thus, the frictional engagement decreases the efficiency of a device using clutch 300.

U.S. Pat. No. 3,202,250 discloses a one-way clutch with an inner race, one or more wedges, and an outer race. As described above, there is excessive frictional engagement of the wedges and the outer race, resulting in the maximization of the frictional inefficiencies described above.

SUMMARY

According to aspects illustrated herein, there is provided a one-way clutch, including: an inner race including a first outer circumference with a first plurality of ramps and at least one wedge plate including: a first inner circumference with a second plurality of ramps; a second outer circumference; and a first plurality of slots: passing through material forming the at least one wedge plate in an axial direction; including respective first ends open to the second outer circumference; and including respective second ends radially outward of the first inner circumference and enclosed by the at least one wedge plate. The one-way clutch includes an outer race including a second inner circumference. The outer race is able to rotate with respect to the inner race in a first circumferential direction. Rotation of the outer race in a second circumferential direction, opposite the first circumferential direction, causes the rotation of the outer race to lock to rotation of the inner race.

According to aspects illustrated herein, there is provided a one-way clutch, including an inner race including a first outer circumference with a plurality of first ramps and at least one wedge plate including: a first inner circumference with a plurality of second ramps; a second outer circumference; a first plurality of slots: passing through material forming the at least one wedge plate in an axial direction; including respective first ends open to the second outer circumference; and including respective second ends radially outward of the first inner circumference and enclosed by the at least one wedge plate. The wedge plate includes a second plurality of slots: passing through the material forming the at least one wedge plate in an axial direction; including respective third ends open to the first inner circumference; and including respective fourth ends radially inward of the second outer circumference and enclosed by the at least one wedge plate. The one-way clutch includes an outer race including a second inner circumference. At least respective portions of the first and second pluralities of slots overlap in a first or second circumferential direction. A radial line extending from the inner race to the outer race and circumferentially disposed between: two slots from the first plurality of slots adjacent in the first or second circumferential directions; two slots from the second plurality of slots adjacent in the first or second circumferential directions; or, one slot each from the first and second pluralities of slots adjacent in the first or second circumferential directions, passes through the material forming the at least one wedge plate without encountering an opening in the material. The outer race is able to rotate with respect to the inner race in the first circumferential direction. Rotation of the outer race in the second circumferential direction, opposite the first circumferential direction, causes the rotation of the outer race to lock to rotation of the inner race.

According to aspects illustrated herein, there is provided a one-way clutch, including: an inner race including a first outer circumference with a first plurality of ramps and at least one wedge plate including: a first inner circumference with a second plurality of ramps; and a first plurality of slots: passing through material forming the at least one wedge plate in an axial direction; including respective first ends open to the second outer circumference; and including respective second ends radially outward of the first inner circumference and enclosed by the at least one wedge plate. The wedge plate includes a second plurality of slots: passing through the material forming the at least one wedge plate in the axial direction; including respective third ends open to the first inner circumference; and including respective fourth ends radially inward of the second outer circumference and enclosed by the at least one wedge plate, and a second outer circumference including a plurality of segments. The one-way clutch includes an outer race including a second inner circumference. Respective pairs of segments from the plurality of segments, adjacent in the first circumferential direction, are separated in the first circumferential direction by a respective slot from the first plurality of slots. The outer race is able to rotate with respect to the inner race in a first circumferential direction. Rotation of the outer race in a second circumferential direction, opposite the first circumferential direction, causes the rotation of the outer race to lock to rotation of the inner race. A magnitude of a radially outward force exerted on the second inner circumference by the at least one wedge plate varies according to a number of slots in the first plurality of slots or a circumferential length of the plurality of segments.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
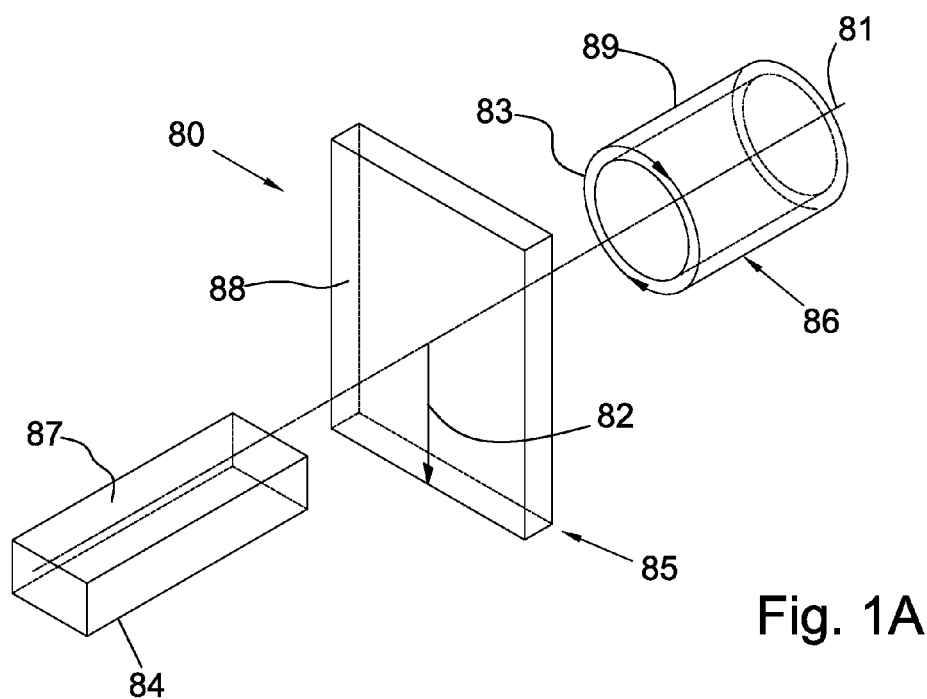
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
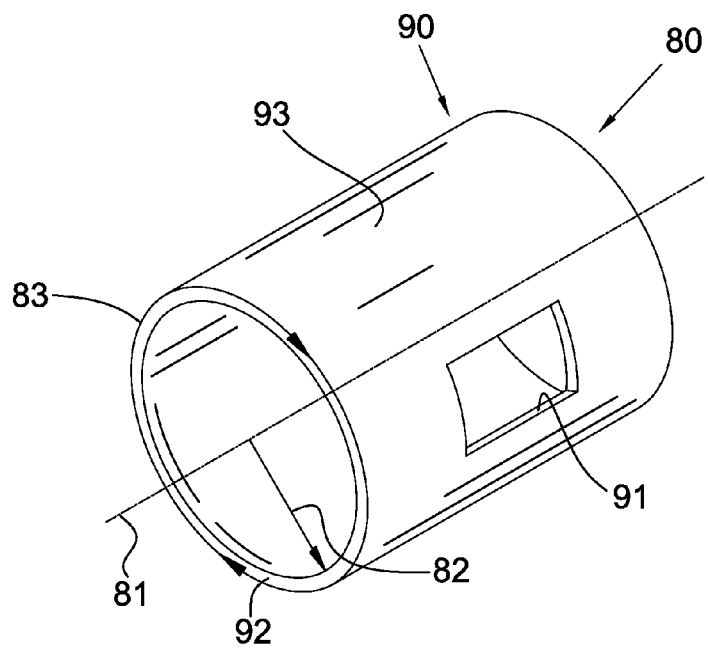
FIG. 1B is a perspective view of an object in the cylindrical coordinate system of FIG. 1A demonstrating spatial terminology used in the present application; and, FIG. 2 is an exploded view of a one-way clutch with reduced friction in a freewheel mode.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
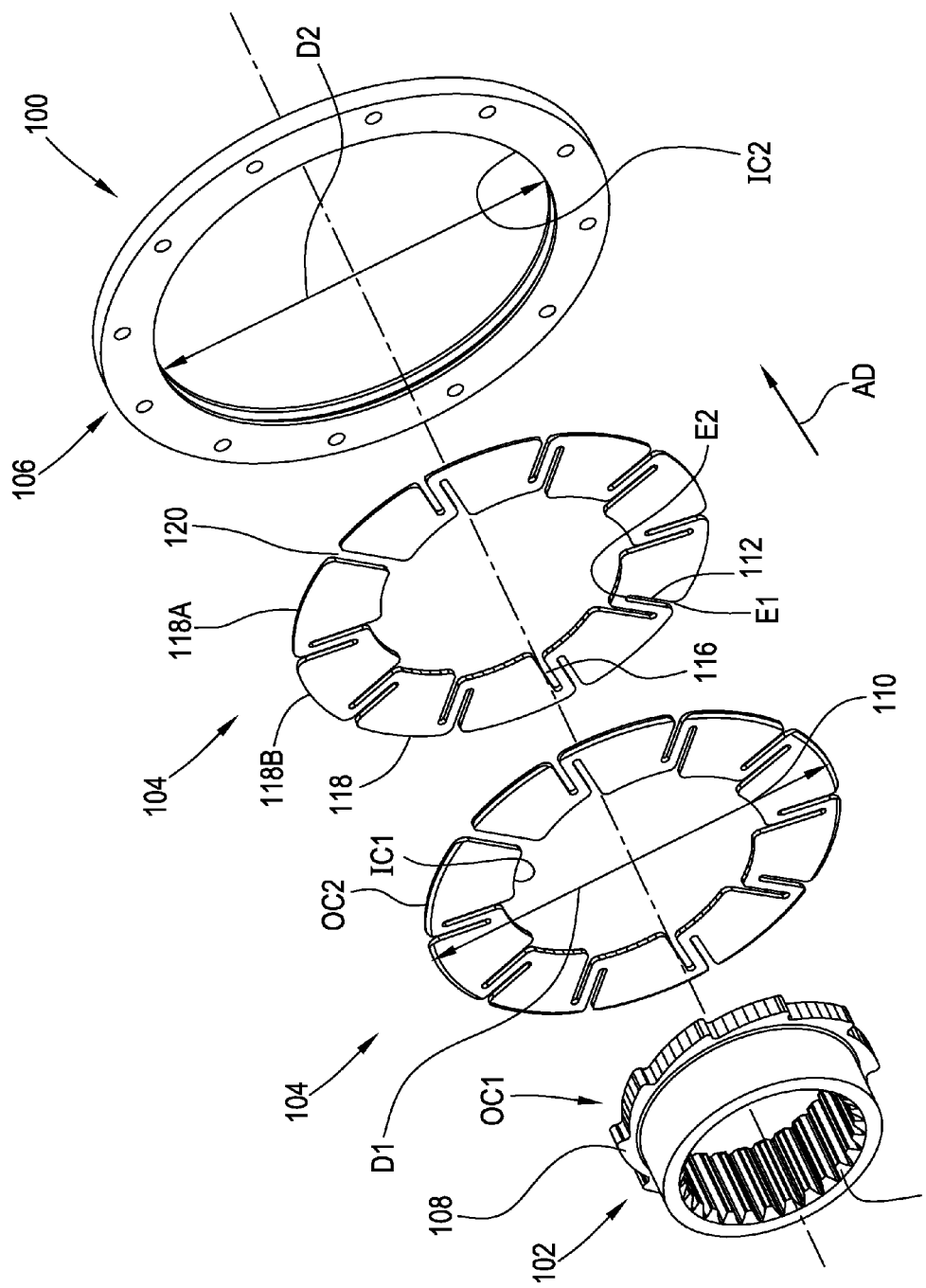

FIG. 2 is an exploded view of one-way clutch 100 with reduced friction.

Figure 3:
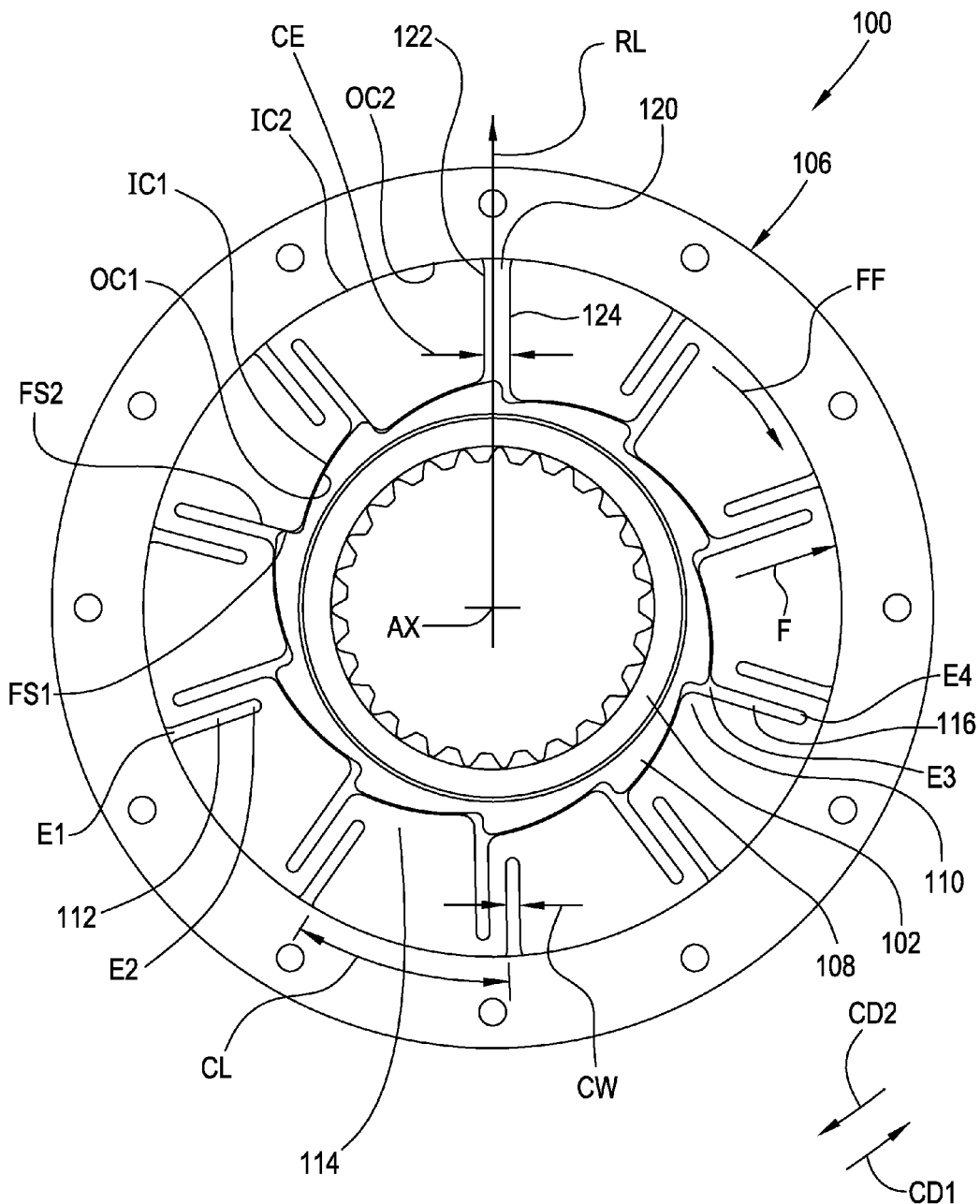
FIG. 3 is a front view of the one-way clutch of FIG. 2 in a free wheel mode.

FIG. 3 is a front view of one-way clutch 100 of FIG. 2 in a free wheel mode. The following should be viewed in light of FIGS. 2 and 3. Clutch 100 includes inner race 102, at least one wedge plate 104, and outer race 106. In an example embodiment, clutch 100 includes two wedge plates 104; however, it should be understood that other numbers of wedge plates are possible. The inner race includes outer circumference OC1 with ramps 108. Each wedge plate includes outer circumference OC2 and inner circumference IC1 with ramps 110. The outer race includes inner circumference IC2. Wedge plate 104 includes slots 112 passing through material forming the wedge plate in an axial direction, for example, AD. Each slot 112 includes end E1 open to OC2 and end E2 radially outward of IC1 and enclosed by the wedge plate. That is, slot 112 does not pass through the wedge plate to IC1. The outer race is able to rotate with respect to the inner race in circumferential direction CD1

Figure 4:
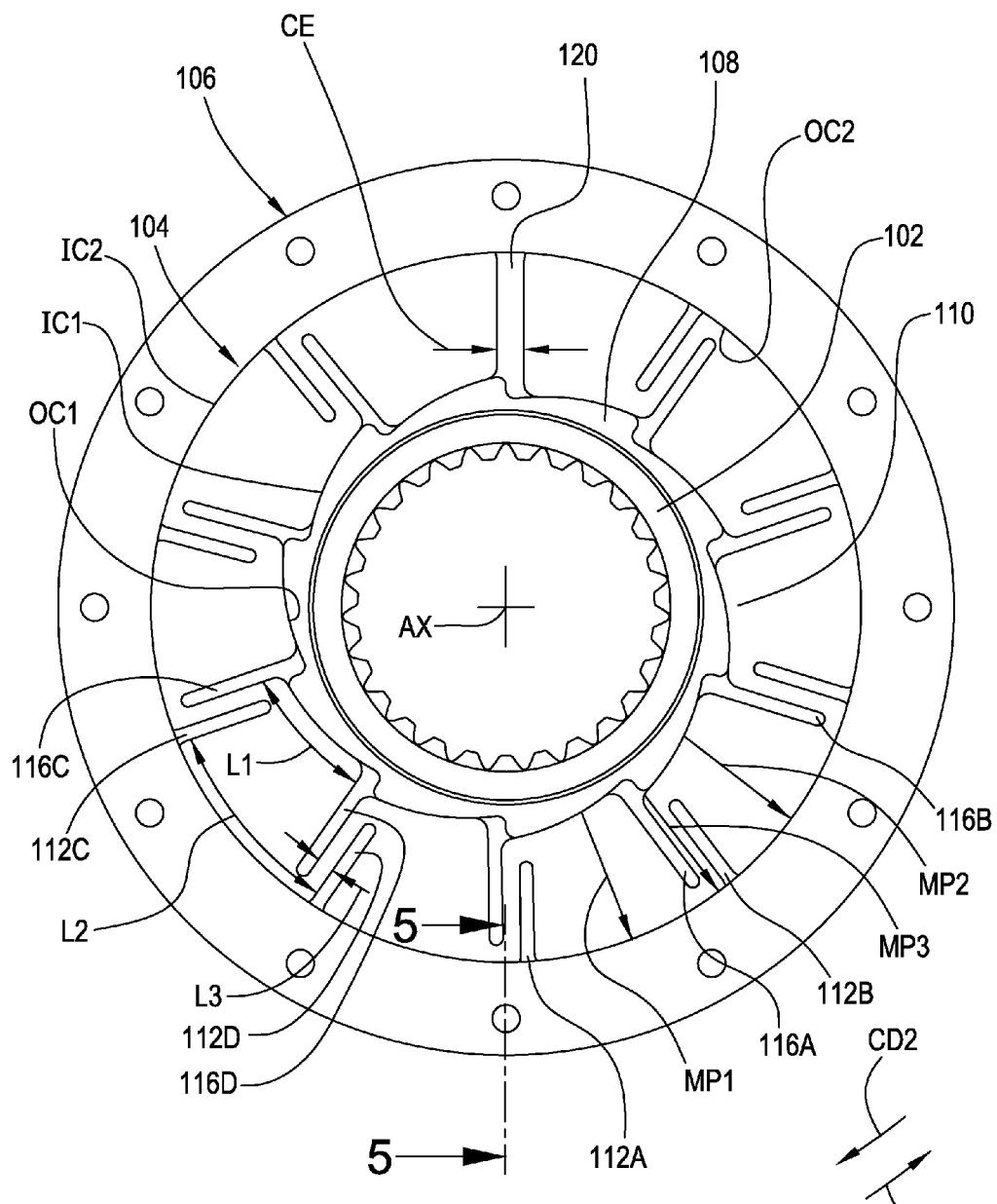
FIG. 4 is a front view of the one-way clutch of FIG. 2 in a locking mode.

FIG. 4 is a front view of one-way clutch of FIG. 2 in a locking mode. The following should be viewed in light of FIG. 2 through 4. In locking mode, the rotation of the outer race is locked to the rotation of the inner race by rotation of the outer race in direction CD2, opposite CD1. In an example embodiment, the inner race is rotationally fixed, for example, via splines 114. That is, the inner race cannot rotate. In this case, in the locking mode, the outer race also is prevented from rotating.

In an example embodiment, wedge plate 104 includes slots 116 passing through material forming the wedge plate in the axial direction. Each slot 116 includes end E3 open to IC1 and end E4 radially inward of OC2 and enclosed by the wedge plate. That is, slot 116 does not pass through the wedge plate to OC2. In an example embodiment, at least respective portions of slots 112 and 116 overlap in a circumferential direction such as CD1 or CD2.

OC2 includes a plurality of segments 118. Respective pairs of the segments 118, for example 118A and 118B, adjacent in a circumferential direction such as CD1 or CD2, are separated in the circumferential direction by a respective slot 112. In free wheel mode, at least some of the segments 118 are in contact with IC2. In an example embodiment, in the locking mode, all of segments 118 are in contact with IC2.

Each wedge plate includes radially disposed gap 120 separating ends 122 and 124 of the wedge plate such that the wedge plate is wholly discontinuous in a circumferential direction at the gap. For example, radial line RL1 passes through gap 120 without contacting the wedge plate. In general, wedge plate 104 is elastic in a circumferential direction due to gap 120 and diameter D1 for OC2 of wedge plate 104 in a free state (not installed in the outer race) is greater than diameter D2 of IC2 the outer race. Therefore, when a wedge plate is installed in the outer race, circumferential extent CE of the gap is reduced and the elasticity of the wedge plate urges the wedge plate radially outward to contact the outer race and exert radially outward force F on IC2.

In the free wheel mode, torque FF, opposing rotation of the outer race in direction CD1, is needed to enable the switch from free-wheel mode to locking mode. A magnitude of torque FF is proportional to a magnitude of force F (as F increases, FF likewise increases). The magnitude of F depends on the characteristics of the wedge plate (for example, the difference in respective diameters between OC2 and IC2 and the stiffness of the wedge plate) and, advantageously on slots 112 and segments 118. For example, the presence of slots 112 reduces the magnitude of force F in comparison to a wedge plate without slots 112. Also, the extent of circumferential length of segments 118 (the addition of circumferential lengths CL for all the segments) impacts F.

Thus, the magnitude of force F is proportional to the number of slots 112 and the circumferential length CL of segments 118. In general, force F decreases as the number of slots 112 increases and CL decreases. It also should be understood that in general, the number of slots 112/CL of segments 118 affects the spring force of the wedge plate, which in turn affects how the wedge plate "unwinds" and the magnitude of force F. Thus, in general, increasing the number of slots 112 or the circumferential width CW of slots 112; or reducing CL, reduces F by reducing the area of contact between the wedge plate and the outer race and impacting the spring characteristics of the wedge plate.

The frictional engagement of a wedge plate and outer race in a free wheel mode reduces the efficiency of a power system utilizing the clutch. For example, the frictional engagement undesirably dissipates a portion of the torque applied to the outer race. Advantageously, clutch 100 controls and reduces the amount of frictional engagement between the wedge plates and the outer race by controlling force F and subsequently, torque FF.

Thus, the wedge plates can be made with respective configurations of slots 112 and segments 118 to produce a desired magnitude of FF, for example, the lowest magnitude of FF needed to enable the clutch switching from the free wheel mode to the locking mode. This configuration in turn advantageously reduces frictional losses for the outer race in the free wheel mode, increasing the efficiency of a device using clutch 100.

As noted above, the wedge plates advantageously reduce friction in the free wheel mode via slots 112 and segments 118. However, the wedge plates also maintain the required strength in the radial direction. During operation in the locking mode, the inner and outer races are wedged against the wedge plates, which results in large radially directed forces being imposed on the wedge plate. Thus, the wedge plates must be strong enough to endure the radially directed forces without buckling. Advantageously, the configuration of slots 112 and 116, and segments 118 provide the desired reduction in torque FF while maintaining the required strength in the radial direction. In particular, a plurality of solid mechanical paths is formed between IC1 and OC2 to bear the radially directed forces. By solid mechanical path, we mean a line connecting IC1 and OC2 passing through the material forming the wedge plate without encountering an interruption in the material such as a hole or slot.

There are three general cases for the configurations of slots 112 and 116 and solid mechanical paths. In one case, mechanical path MP1 passes through the wedge plate between two slots 112 (for example, 112A and 112B) adjacent in a circumferential direction. In another case, mechanical path MP2 passes through the wedge plate between two segments 116 (for example, 116A and 116B) adjacent in a circumferential direction. In a further case, mechanical path MP3 passes through the wedge plate between a segment 112 (for example, 112B) and a segment 116 (for example, 116A) adjacent in a circumferential direction.

Stated otherwise: adjacent slots, such as slots 112C and 112B are separated in the circumferential direction by line L1 in the material forming the wedge plate; adjacent slots 116, such as slots 116C and 116D are separated in the circumferential direction by line L2 in the material forming the wedge plate; and adjacent slots 112 and 116, such as 112D and 116D are separated in the circumferential direction by line L3 in the material forming the wedge plate. Thus, rather than employing slots in a circumferential direction to modulate F, which would compromise the radial strength of the wedge plate, clutch 100 uses slots 112 and 116, which have minimal impact on the radial strength.

To shift from the free wheel mode to the locking mode, the outer race rotates, or displaces, the wedge plates in direction CD2 so that ramps 110 of the wedge plates shift in direction CD2 with respect to ramps 108 of the inner race. The shifting of the ramps cause ramps 108 and 110 to lock and causes the wedge plates to expand against the outer race, rotationally locking the inner race, the wedge plates, and the outer race. To enable the outer race to rotate the wedge plate, there must be at least some frictional engagement of the outer race with the wedge plates in the free wheel mode (outer race rotates in direction CD1). If there is no frictional engagement or insufficient frictional engagement, the outer race simply rotates in direction CD2 without displacing the wedge plates. That is, frictional torque FF must be present to some degree. Contact of segments 118 with IC2 provides FF.

Figure 5:
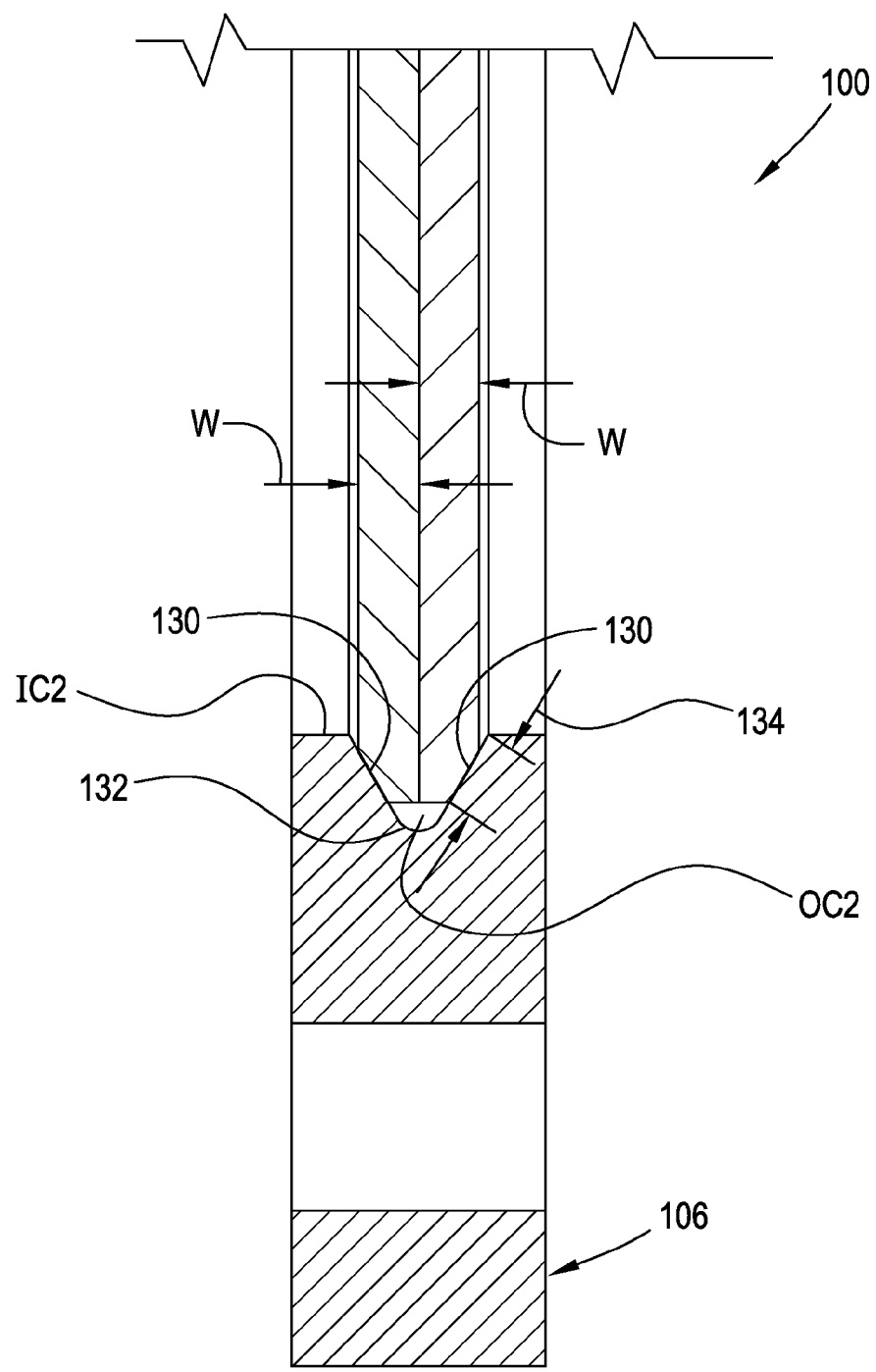
FIG. 5 is a partial cross-sectional view generally along line 5-5 in FIG. 4.

FIG. 5 is a cross-sectional view of the one-way clutch 100 of FIG. 2 generally along line 5-5 in FIG. 4. In an example embodiment, respective OC2s are shaped to form chamfers 130 and IC2 is configured to form V-shaped indent 132 in which the chambers are disposed. Proper design and function of a wedge one-way clutch requires that the frictional engagement between wedge plates and the outer race be as consistent as possible. The area of contact between the wedge plates and the outer race is dependent on width W of the wedge plates, which determines extent 134 of the chamfers. For example, increasing W increases 134, which increases the frictional contact between the wedge plate and the outer race during free wheel mode. However, due to manufacturing constraints, it is difficult to obtain a consistent thickness W for the wedge plates. The variability of thickness W in turn results in undesirable variation of frictional engagement between the wedge plate and the outer race. The negative impacts due to the undesirable variation of frictional engagement in the free wheel mode are multiplied as the area of engagement between the wedge plates and the outer race increases. Thus, the impacts are maximized when the entirety of the wedge plate outer circumferences contact the outer race in the free wheel mode. Advantageously, clutch 100 minimizes the negative impacts of width variations by limiting the circumferential extent of contact between IC2 and OC2.

Figure 6:
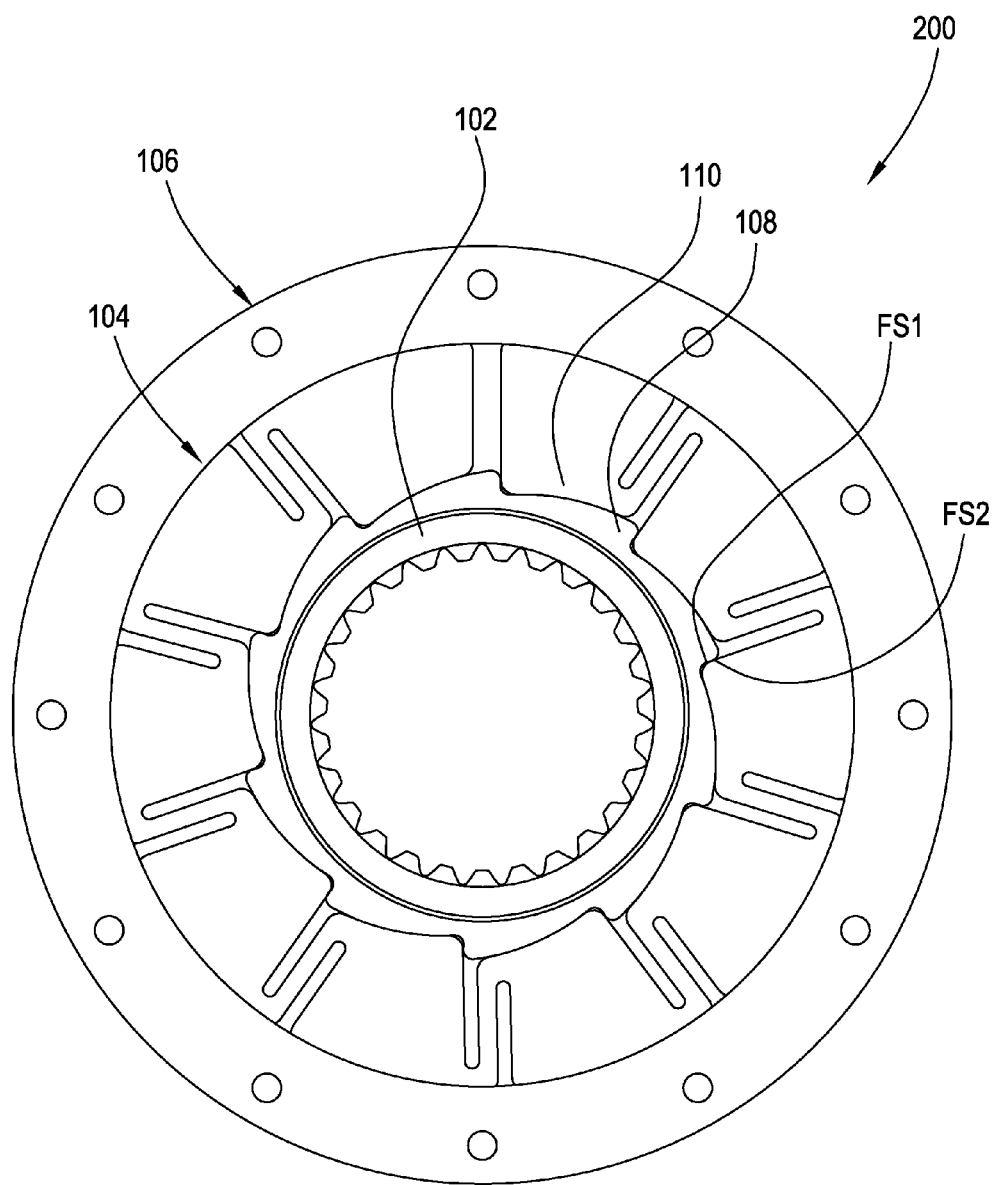
FIG. 6 is a front view of a clutch with reduced friction in freewheel mode; and, FIG. 7 is an exploded view of a prior art one-way clutch.
Figure 7:
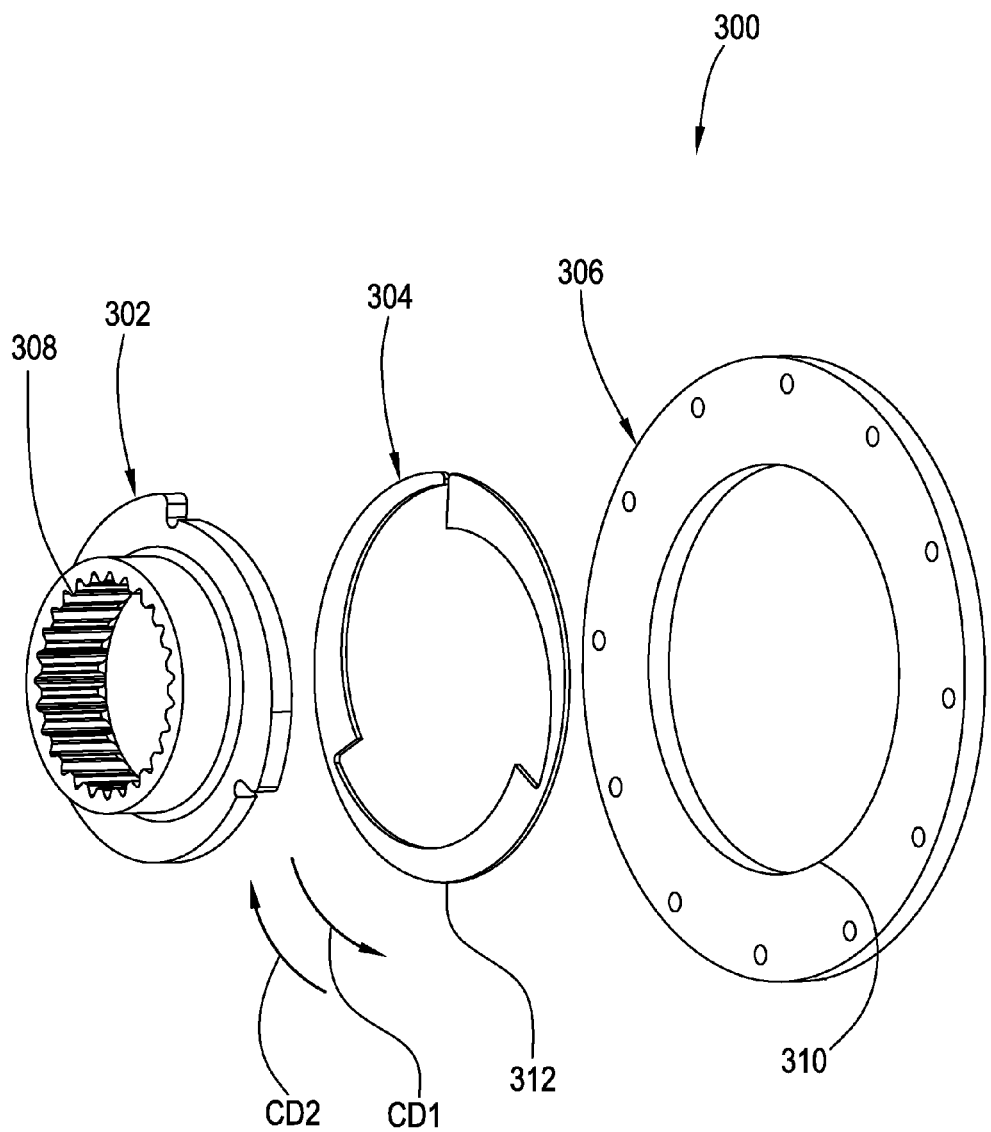

FIG. 6 is a front view of one-way clutch 200 with reduced freewheel friction. In FIG. 3, less than all of the respective surfaces FS1 and FS2 for ramps 108 and 110 are in contact in the freewheel mode. In an example embodiment shown in FIG. 6, all the respective surfaces FS1 and FS2 for ramps 108 and 110 are in contact in the freewheel mode. The discussion regarding clutch 100 is generally applicable to clutch 200. With all the respective surfaces FS1 and FS2 for ramps 108 and 110 in contact in the freewheel mode, the respective magnitudes of F and FF are larger than the general case in which less than all of the respective surfaces FS1 and FS2 for ramps 108 and 110 are in contact in the freewheel mode. However, advantageously, the respective magnitudes of F and FF are less than would be the case if slots 112 were not present. Thus, the efficiency of a device using clutch 200 is increased due to the minimization of losses on the torque load for the outer race due to FF.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A one-way clutch, comprising:
   an inner race including a first outer circumference with a first plurality of ramps;
   at least one wedge plate including:
      a first inner circumference with a second plurality of ramps;
      a second outer circumference; and,
      a first plurality of slots:
         passing through material forming the at least one wedge plate in an axial direction;
         including respective first ends open to the second outer circumference; and,
         including respective second ends radially outward of the first inner circumference and enclosed by the at least one wedge plate; and,
   an outer race including a second inner circumference, wherein:
      the at least one wedge plate includes a radially disposed gap separating fifth and sixth ends of the at least one wedge plate such that the at least one wedge plate is wholly discontinuous in the first or second circumferential direction at the gap;
      the outer race is able to rotate with respect to the inner race in a first circumferential direction;
      rotation of the outer race in a second circumferential direction, opposite the first circumferential direction, causes the rotation of the outer race to lock to rotation of the inner race; and,
      the at least one wedge plate includes a second plurality of slots:
         passing through the material forming the at least one wedge plate in the axial direction;
         including respective third ends open to the first inner circumference; and,
         including respective fourth ends radially inward of the second outer circumference and enclosed by the at least one wedge plate.

2. The one-way clutch of claim 1, wherein a magnitude of a radially outward force exerted on the second inner circumference by the at least one wedge plate varies according to a number of slots in the first plurality of slots.

3. The one-way clutch of claim 2, wherein the magnitude of the radially outward force decreases as the number of slots increases.

4. The one-way clutch of claim 1, wherein at least respective portions of the first and second pluralities of slots overlap in the first or second circumferential direction.

5. The one-way clutch of claim 1, wherein respective slots in the first plurality of slots are separated, in the first or second circumferential directions, from slots in the second plurality of slots or from remaining slots in the first plurality of slots by the material forming the at least one wedge plate.

6. The one-way clutch of claim 1, wherein respective slots in the second plurality of slots are separated, in the first or second circumferential directions, from slots in the first plurality of slots or from remaining slots in the second plurality of slots by the material forming the at least one wedge plate.

7. The one-way clutch of claim 1, wherein:
   a respective pair of slots includes a respective slot from the first plurality of slots and a respective slot from the second plurality of slots adjacent in the first circumferential direction without an intervening slot from the first or second plurality of slots; and,
   a respective radial line extending from the inner race to the outer race and circumferentially disposed between the slots in the respective pair of slots passes through the material forming the at least one wedge plate without encountering an opening in the material or an interruption of the material.

8. The one-way clutch of claim 1, wherein a respective radial line extending from the inner race to the outer race:
   is circumferentially disposed between:
      two slots from the first plurality of slots adjacent in the first circumferential direction; or,
      two slots from the second plurality of slots adjacent in the first circumferential direction, and,
   passes through the material forming the at least one wedge plate without encountering an opening in or interruption of the material.

9. The one-way clutch of claim 1, wherein:
   the second outer circumference of the at least one wedge plate includes a plurality of segments;
   respective pairs of the segments, adjacent in the first circumferential direction, are separated in the first circumferential direction by a respective slot from the first plurality of slots.

10. The one-way clutch of claim 9, wherein a magnitude of a radially outward force exerted on the second inner circumference by the at least one wedge plate varies according to a number of segments in the plurality of segments or a circumferential length of the plurality of segments.

11. The one-way clutch of claim 10, wherein the magnitude of the radially outward force decreases as the number of segments in the plurality of segments increases or the circumferential length decreases.

12. A one-way clutch, comprising:
   an inner race including a first outer circumference with a plurality of first ramps;
   at least one wedge plate including:
      a first inner circumference with a plurality of second ramps;
      a second outer circumference;
      a first plurality of slots:
         passing through material forming the at least one wedge plate in an axial direction;
         including respective first ends open to the second outer circumference; and,
         including respective second ends radially outward of the first inner circumference and enclosed by the at least one wedge plate; and,
      a second plurality of slots:
         passing through the material forming the at least one wedge plate in an axial direction;
         including respective third ends open to the first inner circumference; and, including respective fourth ends radially inward of the second outer circumference and enclosed by the at least one wedge plate; and, an outer race including a second inner circumference, wherein:

at least respective portions of the first and second pluralities of slots overlap in a first or second circumferential direction;

a radial line extending from the inner race to the outer race and circumferentially disposed between:

two slots from the first plurality of slots adjacent in the first or second circumferential directions;

two slots from the second plurality of slots adjacent in the first or second circumferential directions; or, one slot, each from the first and second pluralities of slots adjacent in the first or second circumferential directions, which passes through the material forming the at least one wedge plate without encountering an opening in the material;

the outer race is able to rotate with respect to the inner race in the first circumferential direction; and, rotation of the outer race in the second circumferential direction, opposite the first circumferential direction, causes the rotation of the outer race to lock to rotation of the inner race.

13. A one-way clutch, comprising:

an inner race including a first outer circumference with a first plurality of ramps;

at least one wedge plate including:

a first inner circumference with a second plurality of ramps;

a second outer circumference including a plurality of segments;

a first plurality of slots:

passing through material forming the at least one wedge plate in an axial direction;

including respective first ends open to the second outer circumference; and, including respective second ends radially outward of the first inner circumference and enclosed by the at least one wedge plate;

a second plurality of slots:

passing through the material forming the at least one wedge plate in the axial direction;

including respective third ends open to the first inner circumference; and, including respective fourth ends radially inward of the second outer circumference and enclosed by the at least one wedge plate; and, an outer race including a second inner circumference, wherein:

at least respective portions of the first and second pluralities of slots overlap in the first or second circumferential direction;

respective pairs of segments from the plurality of segments, adjacent in the first circumferential direction, are separated in the first circumferential direction by a respective slot from the first plurality of slots;

the outer race is able to rotate with respect to the inner race in a first circumferential direction;

rotation of the outer race in a second circumferential direction, opposite the first circumferential direction, causes the rotation of the outer race to lock to rotation of the inner race; and, a magnitude of a radially outward force exerted on the second inner circumference by the at least one wedge plate varies according to a number of slots in the first plurality of slots or a circumferential length of the plurality of segments.

* * * * *